3,412,122
TRIS(ω-CARBOXYPOLYMETHYLENE) TIN CHLORIDE
William J. Considine, Somerset, and Gerald H. Reifenberg, Plainfield, N.J., assignors to M & T Chemicals Inc., New York, N.Y., a corporation of Delaware
No Drawing. Filed Jan. 3, 1966, Ser. No. 518,002
8 Claims. (Cl. 260—429.7)

This invention relates to tetravalent organotin compounds containing functionally substituted alkyl groups and, more particularly, to tris(ω-carboxypolymethylene) tin chloride and to a method for preparing the same.

Although a great many organotin compounds have been prepared at present, very few of these contain functional substituted alkyl groups. This is due mainly to the fact that the synthetic routes available for the formation of tin-carbon bonds in general cannot be used when reactive functional groups are present. In a more recently developed method, one or more carboxy groups may be introduced directly to the tin atom by an addition reaction in which an aromatic tin hydride or an aliphatic tin hydride is reacted with an olefinic compound. This method, however, is not suitable for synthesizing the tetravalent organotin chloride of this invention.

It is, therefore, the principal object of this invention to provide novel tetravalent organotin chlorides characterized by the presence of three carboxyalkyl groups. Another object of this invention is to set forth a new technique of preparing these novel compounds. Other objects will be apparent to those skilled in the art on inspection of the following description.

The novel organotins of this invention have the general formula:

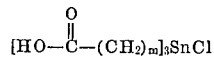

in which $m$ is an integer at least about 2. Preferably, the carbon atoms of the polymethylene chain are less than 5. These novel compounds are prepared, advantageously, by the method which comprises reacting initially an excess amount of a hydroxide with a compound of the formula:

$$Sn[(CH_2)_mCN]_4$$

and subjecting the product of the initial reaction to acidification with an excess amount of hydrochloric acid at a temperature above about 20° C. The hydroxide suitable for this method includes sodium hydroxide, potassium hydroxide, lithium hydroxide, calcium hydroxide, barium hydroxide, and strontium hydroxide.

Tetrakis[ω-cyanopolymethylene]tin which may be employed in the method of this invention, may be prepared by any suitable method. We found it to be advantageous to use an electrolytic method for the synthesis. Tetrakis(2-cyanoethyl)tin, for example, is produced by the electrolysis of an aqueous alkaline solution of acrylonitrile with a tin cathode. The detail of this electrolytic procedure is described by Tomilov and Kaabak (A. P. Tomilov and L. V. Kaabak, Zhur. Priklad. Khim. 32, 2600 (1959)). This method has the advantage in that there is no sacrifice of active metal values (e.g. magnesium) as contrasted to commercial processes for organotins.

The exact nature of reactions involved in the method of the present invention is not completely understood. The reactions, however, may be postulated as follows:

(1) $Sn[(CH_2)_mCN]_4 + 4MOH + 4H_2O \longrightarrow$

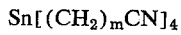

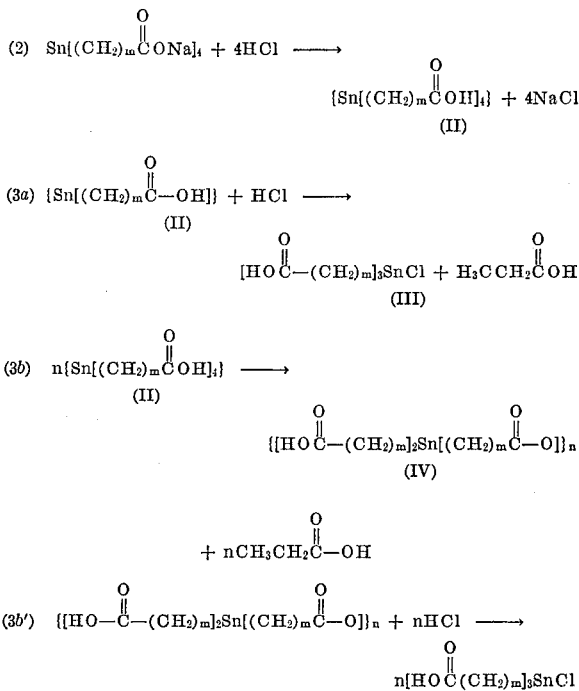

The $m$ in the above equations has the same meaning as depicted above, and MOH may be sodium hydroxide, potassium hydroxide, lithium hydroxide, calcium hydroxide, barium hydroxide, and strontium hydroxide. It is not certain by which of the two alternative routes, (3a) or (3b), that the reaction proceeds during acidification. Based on the known chemical reactions (3a) appears to be a more likely reaction although the (3b) reaction is probable.

The saponification preferably is carried out in an aqueous reaction medium containing a soluble alcohol. There does not appear to be any critical limits as to the molar ratio of water and alcohol that may be used. The molar ratio within the wide range of 5:1 to 1:5, for example, may be employed. A preferred solvent system is an aqueous methanol solvent.

The amount of the hydroxide used for saponification may be a stoichiometric amount. Preferably, an excess amount is used to insure the complete saponification. The molar ratio of nitrile to hydroxide may vary from 1:4 to 1:10. In certain instances, we found a molar ratio of nitrile to hydroxide of about 1:7 works best.

The reaction may be conducted at or below the reflux temperature until the saponification is complete, which can be conveniently judged by the termination of the release of ammonia. The time required for the reaction is dependent on the temperature and the reactants used. In an aqueous methanol reaction medium, the reaction generally requires about 2–3 hours.

In the acidification step, the temperature of the reaction becomes critical and must be maintained at above about 20° C. A temperature in the range of 20°–50° C. is suitable, and preferably it is in the range of 25°–35° C. For acidification, the amount in moles of hydrochloric acid used must be in excess of the molar quantity of hydroxide used in the saponification step. The excess must be at least equivalent to the molar quantity of the nitrile used, preferably more.

Further to illustrate this invention a specific example is described hereinbelow:

Example.—Preparation of tris(2-carboxyethyl)tin chloride

A mixture of 51.6 gms. of tetrakis(2-cyanoethyl)tin, 46.5 gms. of sodium hydroxide in 105 mls. of water, and 255 mls. of methanol was refluxed for two hours. During this period, practical complete solution took place. The temperature of the reflux was 74°–76° C., and ammonia was detected with pH paper as being given off through the top of the condenser. After cooling to about 40° C., the mixture was filtered and the solvents stripped off from the mother liquor under reduced pressure. A white semi-solid was obtained as residue which probably contained some water. This solid was dissolved in 150 mls. of $H_2O$ and then filtered to remove a small amount of insoluble material. 100 mls. of concentrated hydrochloric acid was then added to the filtrate portionwise. The solution was acid at this point, and a strong odor of propionic acid was noted. The solution was evaporated by a water aspirator to about 175 mls. at which concentration a solid was precipitated and upon cooling a pink color oil was also precipitated. The oil was recovered after the solid (NaCl) was removed and was redissolved in acetone. Tris(2-carboxyethyl)tin chloride in acetone was then recovered as a white solid with a yield of 36.7%. The elemental analysis showed the tin:chlorine:carbon:hydrogen was 1:1.9:15 corresponding to the formula

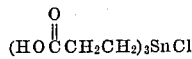

*Elemental analysis.*—Calculated for ($C_9H_{15}ClO_6Sn$): Sn, 31.80; C, 28.96; H, 4.05; Cl, 9.50; mol. wt. 373.2 monomer. Found for ($C_9H_{15}ClO_6Sn$): Sn, 31.63; C, 29.26; H, 3.96; Cl, 9.14; mol. wt. 380 (THF).

The infrared spectroscopic analysis showed

at $5.9\mu$ and a very broad —OH band, characteristic of carboxylic acid at $3–4.5\mu$.

Tris(2-carboxyethyl)tin chloride is a white crystalline solid, M.P.=96.5–8°. It is water soluble and has solubility in many organic solvents. Its aqueous solutions are fairly acidic. The products of this invention may find application as biocides and plastic stabilizers.

We claim:

1. A method for preparing an organotin compound of the formula:

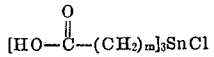

in which $m$ is at least about 2, which comprises reacting initially an excess amount of a hydroxide selected from the group consisting of sodium hydroxide, potassium hydroxide, lithium hydroxide, calcium hydroxide, barium hydroxide, and strontium hydroxide with a compound of the formula:

$$Sn[(CH_2)_mCN]_4$$

and subjecting the product of the initial reaction to acidification with an excess amount of hydrochloric acid at a temperature above about 20° C.

2. A method according to claim 1 wherein the acidification is carried out in the range between 20°–50° C.

3. A method according to claim 1 in which the molar ratio of the hydroxide in the initial reaction to hydrochloric acid in the acidification is greater than 1:1.

4. A method according to claim 1 wherein the $m$ is less than 5.

5. A method according to claim 1 in which $m$ is equal to 2, the hydroxide is sodium hydroxide, the molar ratio of the hydroxide to said organotin compound in the reaction is about 7:1, the molar ratio of hydroxide to hydrochloric acid is greater than 1:1, and the reaction is in an aqueous alcoholic medium.

6. An organotin compound of the formula:

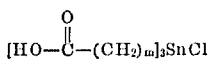

in which $m$ is an integer at least about 2.

7. An organotin compound of claim 6 in which $m$ is less than 5.

8. An organotin of claim 6 in which the formula is:

References Cited

UNITED STATES PATENTS 3,332,970   7/1967   Smith _____ 260—429.7
3,347,833   10/1967  Smith _____ 260—429.7 X TOBIAS E. LEVOW, *Primary Examiner.*

W. F. W. BELLAMY, *Assistant Examiner.*